United States Patent [19]

Suzuki

[11] Patent Number: 4,714,336
[45] Date of Patent: Dec. 22, 1987

[54] FOCAL PLANE SHUTTER FOR CAMERAS

[75] Inventor: Akira Suzuki, Itabashi, Japan

[73] Assignee: Copal Company Limited, Tokyo, Japan

[21] Appl. No.: 874,152

[22] Filed: Jun. 13, 1986

[30] Foreign Application Priority Data

Jun. 14, 1985 [JP] Japan ............................ 60-89588[U]

[51] Int. Cl.$^4$ ................................................ G03B 9/40
[52] U.S. Cl. ................................... 354/246; 354/249
[58] Field of Search ............... 354/246, 247, 248, 249, 354/250

[56] References Cited

U.S. PATENT DOCUMENTS

| 4,024,555 | 5/1977 | Inoue ................................... 354/249 |
| 4,231,650 | 11/1980 | Saito et al. .......................... 354/246 |
| 4,493,544 | 1/1985 | Uematsu .............................. 354/246 |

FOREIGN PATENT DOCUMENTS

| 48-97950 | 8/1973 | Japan . | |
| 57-164725 | 10/1982 | Japan | 354/246 |
| 60-172137 | 11/1985 | Japan . | |

*Primary Examiner*—A. A. Mathews
*Attorney, Agent, or Firm*—Cushman, Darby & Cushman

[57] ABSTRACT

A focal plane shutter for cameras wherein a plurality of shutter blades to open and close an exposure aperture are shared and pivoted by three arms pivoted on a base plate to secure an excellent durability even for a high speed operation. One of the three arms is pivoted on the base plate by fitting a bearing sleeve calked to the arm to a shaft standing on the base plate and the other two arms are pivoted on the base plate by fitting holes made in the respective arms to respective shafts standed on the base plate.

5 Claims, 6 Drawing Figures

FOCAL PLANE SHUTTER FOR CAMERAS

BACKGROUND OF THE INVENTION (a) Field of the Invention:

This invention relates to a focal plane shutter for cameras and more particularly to the supporting structure of shutter blades in a focal plane shutter wherein shutter blades made of a plural number of opaque thin plates move parallelly with respect to a plane including an exposure aperture in order to open and close the exposure aperture.

(b) Description of the Prior Art:

An example of this kind of conventional focal plane shutter for cameras is known by U.S. Pat. No. 4,024,555. FIG. 1 shows the conventional example wherein the shutter includes an opening blade assembly O and closing blade assembly C arranged in the relation of mirror images with each other between a base plate 1 having an exposure aperture 1a and a cover plate 10 having an aperture 10a coinciding with the exposure aperture 1a. The opening blade assembly O comprises a light interrupting blade group including at least first blades 3a to 3d and a second blade 3e to open and close the exposure apertures 1a and 10a, a first arm 4a pivoted to the base plate, first blades and second blade respectively and a second arm 4b pivoted to the base plate, first blades and second blade respectively so as to form a parallel link mechanism in cooperation with the first arm. The closing blade assembly C is substantially of the same structure as of the opening blade assembly O. The pivoting structure of the first arm 4a and second arm 4b to the base plate 1 are shown with an enlarged scale in FIG. 2. That is to say, the space formed between the base plate 1 and cover plate 10 integrally coupled through screws S is so narrow that, for example, the arm 4a is pivoted by fitting a shaft 2a stood on the base plate 1 into a bearing sleeve 5 calked to the arm 4a and the arm 4b is pivoted by fitting a shaft 2b stood on the base plate 1 into a hole 4b' formed in the arm 4b. The pivoting by fitting the shaft 2a into the bearing sleeve 5 is comparatively so large in the dimension in the radial direction of the shaft 2a that, in order to avoid the interference of this pivoting part with the pivoting parts of the blade group to the arms 4a and 4b, the above mentioned structure is adopted. However, this structure includes a disadvantage that the pivoting by fitting the shaft 2b into the hole 4b' *is lower in the durability than the pivoting by fitting the shaft 2a into the bearing sleeve 5*. This disadvantage will become a very grave problem in case the shutter speed is required to be high and the focal plane shutter is desired to be endurable to a high speed operation.

SUMMARY OF THE INVENTION

Therefore, a primary object of the present invention is to provide a focal plane shutter for cameras of the above mentioned type endurable to the use for a long period even if a high speed operation is made.

According to the present invention, the focal plane shutter comprises a light interrupting blade group including at least first blades and a second blade to open and close an exposure aperture, a first arm pivoted to a base plate, the first blade and second blade respectively at separate spots, a second arm pivoted to the base plate and first blades respectively at separate spots to form a parallel link mechanism in cooperation with the first arm, and a third arm pivoted to the base plate and second blade respectively at separate spots to form a parallel link mechanism in cooperation with the first arm. Thereby, a part of the load caused by the inertia of the blade group can be dispersed to the second and third arms.

This and other objects as well as the attendant advantages of the present invention will become more apparent from the following detailed description of the preferred embodiment when taken in conjunction with the accompanying drawings.

DESCRIPTION OF THE PREFERRED EMBODIMENTS

Figure 1:
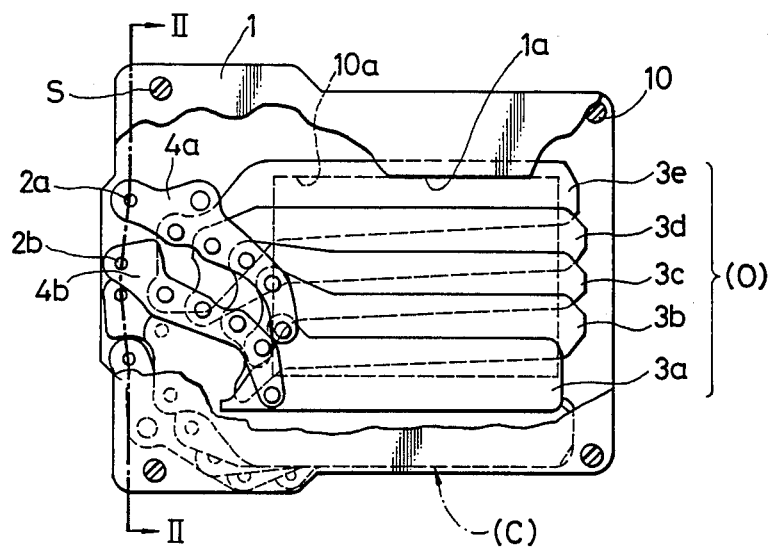
FIG. 1 shows a partly broken plan view of the important portion of an example of a conventional focal plane shutter.
Figure 2:
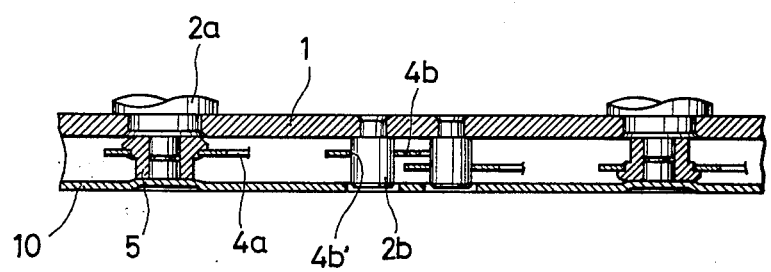
FIG. 2 shows an enlarged sectional view taken along the line II—II in FIG. 1.
Figure 3:
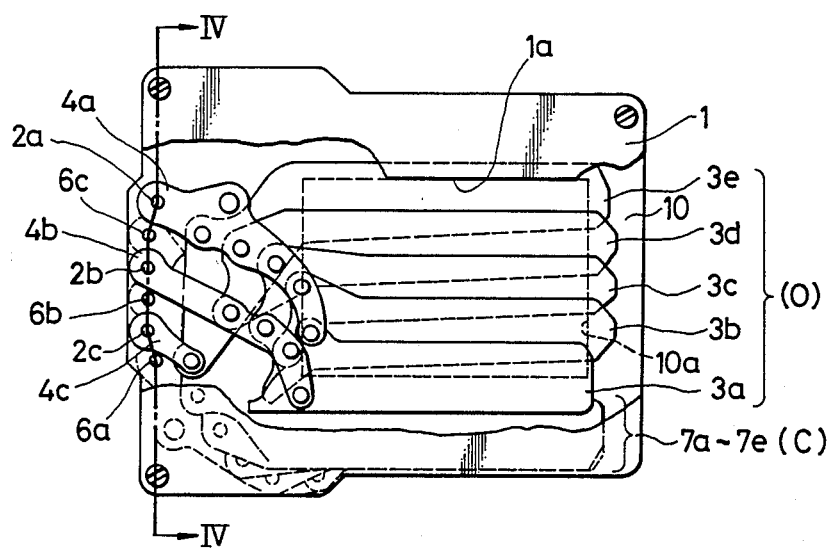
FIG. 3 shows a partly broken plan view of the important portion of an embodiment of the focal plane shutter according to the present invention.
Figure 4:
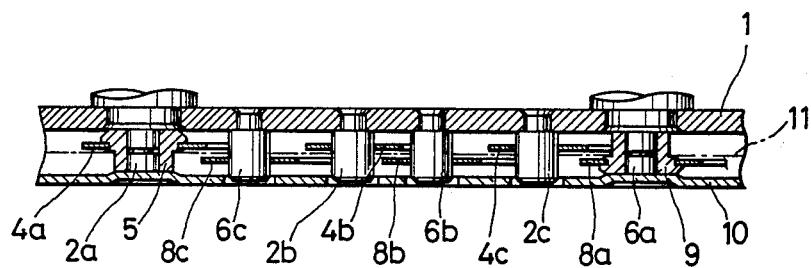
FIG. 4 shows an enlarged sectional view taken along the line IV—IV in FIG. 3.

First of all, with reference to FIGS. 3 and 4, the explanation shall be made by attaching the same reference numerals to the substantially same parts and portions as in the conventional shutter shown in FIGS. 1 and 2.

The reference numeral 1 represents a base plate having an exposure aperture 1a, the reference numerals 3a, 3b, 3c, 3d and 3e represent shutter blades made respectively of opaque thin plates and forming a light interrupting blade group, the reference numeral 4a represents a first arm pivoted to a shaft 2a by fitting the shaft 2a into a bearing sleeve 5 carrying the first arm and pivoted to the respective blades 3a, 3b, 3c, 3d and 3e respectively in different positions, 4b represents a second arm pivoted to a shaft 2b and blades 3a, 3b, 3c and 3d (first shutter blades) respectively in different positions to form a parallel link mechanism in cooperation with the first arm 4a and 4c represents a third arm pivoted to a shaft 2c and the blade 3e (second shutter blade) respectively in different positions to form a parallel link mechanism in cooperation with the first arm. For example, the opening blade assembly O is formed of the above described members 2a, 2b, 2c, 3a, 3b, 3c, 3d, 3e, 4a, 4b, 4c and 5 and moves between the illustrated unfolded position (in which the exposure apertures 1a and 10a are covered by the light interrupting blade group 3a to 3e) and the folded position not illustrated (in which the exposure apertures 1a and 10a are not covered by the light interrupting blade group 3a to 3e). Further, the closing blade assembly C is formed fundamentally the same as the opening blade assembly O and moves between the unfolded position not illustrated and the illustrated folded position. However, the closing blade assembly C is arranged on the base plate 1 as inverted with respect to the opening blade assembly O so as to be in the folded position when the opening blade assembly O is in the unfolded position and to be in the unfolded position when the opening blade assembly O is in the folded position. That is to say, shafts 6a, 6b and 6c correspond respectively to the shafts 2a, 2b and 2c, blades 7a to 7e correspond respectively to the blades 3a to 3e, arms 8a, 8b and 8c correspond respectively to the first arm 4a, second arm 4b and third arm 4c and a bearing sleeve 9 corresponds to the bearing sleeve 5. Between the base plate 1 and cover plate 10, as shown by the chain line in FIG. 4, a partition plate 11 is provided to separate the opening blade assembly O and closing blade assembly C from each other and to avoid the interference with each other. An aperture coinciding with the exposure apertures 1a and 10a is formed in the partition plate 11.

The operation of the above described shutter shall be explained in the following.

Now, if it is assumed that FIG. 3 shows the shutter in its cocked state, by the shutter release, first the opening blade assembly O will be moved toward the folding position to open the exposure apertures and then the closing blade assembly C will be moved toward the unfolding position to close the exposure apertures. The exposure time will be determined by the lag (time interval) between the above mentioned movement starting time point of the opening blade assembly O and the above mentioned movement staring time point of the closing blade assembly C. By the shutter cocking operation, the opening blade assembly O and closing blade assembly C will be simultaneously moved respectively toward the unfolded position and folded position so that thereby the opening blade assembly O and closing blade assembly C will be again brought to the respective positions in FIG. 3 without opening the exposure apertures. A further explanation of the shutter operation is described in detail in U.S. Pat. No. 4,024,555 but has nothing to do directly with the present invention and therefore shall be omitted here.

The opening blade assembly O and the closing blade assembly C will move as described above while being related with each other. When such movement starts and ends, by the inertia of the blades 3a to 3e and 7a to 7e, a large stress and/or impact force will be occurred in the opening blade assembly O and the closing blade assembly C. However, according to the present invention, the above mentioned load, that is, the concentrated stress and impact force will be dispersed to the three arms, therefore, the load applied to the respective arms will be smaller than in the conventional structure. As a result, the durability of the shutter for the high speed operation will remarkably improve.

Figure 5:
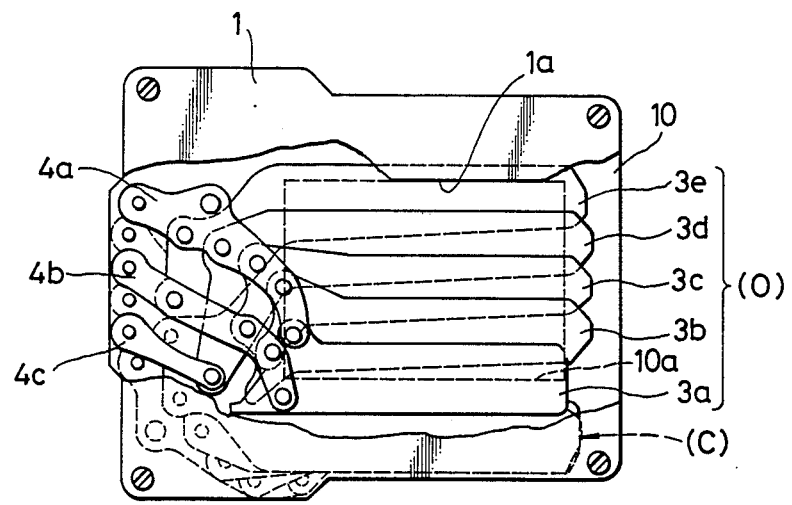
FIG. 5 shows a partly broken plan view of the important portion of another embodiment of the focal plane shutter according to the present invention.

FIG. 5 shows another embodiment of the present invention. This embodiment is different from the already described embodiment in respect that the blade 3d is pivoted to the first and third arms 4a and 4c and the blade 3e is pivoted to the first and second arms 4a and 4b. However, it is the same as the already described embodiment in the other structure, operation and advantages and therefore shall be omitted in the explanation.

Figure 6:
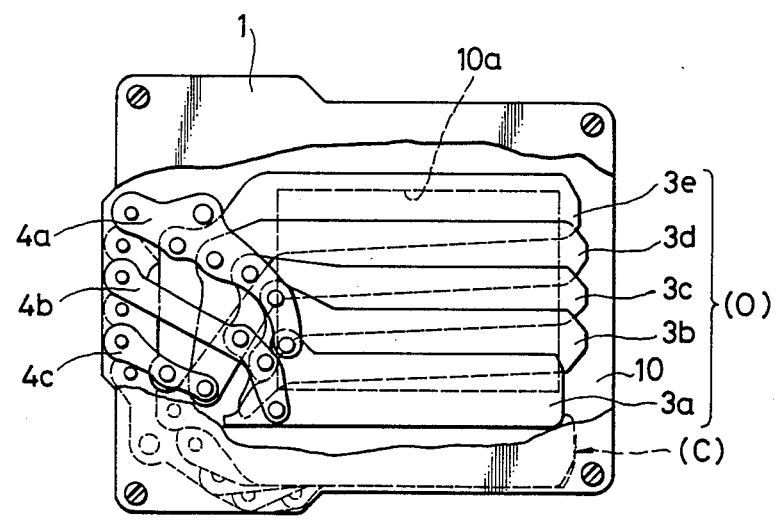
FIG. 6 shows a partly broken plan view of the important portion of still another embodiment of the focal plane shutter according to the present invention.

FIG. 6 shows further another embodiment of the present invention. This embodiment is different from the already described embodiments in respect that the blades 3d and 3e are pivoted to the first and third arms 4a and 4c, respectively. This embodiment is also the same as the already described embodiments in the other structure, operation and advantages and therefore shall be omitted in the explanation.

Both of the above mentioned second and third embodiments have been explained with respect to the opening blade assembly O but the same modifications can be likewise applied to the closing blade assembly C.

In the above embodiments, it is explained that the opening blade assembly O and the closing blade assembly C are arranged on the base plate in the relation of mirror images with each other or in the relation inverted with respect to each other. However, in case the present focal plane shutter is used for a single-lens reflex camera, the number of blades in the blade assembly to be arranged on the finder side of the camera may be larger than that in the blade assembly to be arranged opposite to the finder with respect to the exposure aperture, in order to make the space to be occupied by the folded blade assembly on the finder side small.

What is claimed is:

1. A focal plane shutter for cameras including a base plate having an exposure aperture therein and an opening blade assembly and closing blade assembly arranged on said base plate to open and close the exposure aperture, at least one of said opening blade assembly and closing blade assembly comprising:

a light interrupting blade group including first shutter blades and a second shutter blade partly overlapping one of said first shutter blades to open and close the exposure aperture, a first arm pivoted on said base plate and pivoted to said first shutter blades and second shutter blade respectively at different positions to support said first shutter blades and second shutter blade, a second arm pivoted on said base plate and pivoted to said first shutter blades respectively at different positions to form a parallel link mechanism in cooperation with said first arm, and a third arm pivoted on said base plate and pivoted to said second shutter blade respectively at different positions to form a parallel link mechanism in cooperation with said first arm, said first arm being pivoted on said base plate by fitting a shaft standing on said base plate into a bearing sleeve carrying said first arm, and said second arm and third arm being pivoted on said base plate by fitting shafts provided in said base plate respectively into holes made in said second arm and third arm.

2. A focal plane shutter for cameras according to claim 1 wherein, said first shutter blades and second shutter blade are arranged in series.

3. A focal plane shutter for cameras according claim 1 wherein, said second shutter blade is sandwiched by a pair of opaque thin plates, arranged adjacent to each other, forming said first shutter blades.

4. A focal plane shutter for cameras including a base plate having an exposure aperture therein and an opening blade assembly and closing blade assembly arranged on said base plate to open and close the exposure aperture, at least one of said opening blade assembly and closing blade assembly comprising:

a light interrupting blade group including first shutter blades and second shutter blades one of which is partly overlapped with one of said first shutter blades, to open and close the exposure aperture, a first arm pivoted on said base plate and pivoted to said first shutter blades and second shutter blades respectively at different positions to support said first shutter blades and second shutter blades, a second arm pivoted on said base plate and pivoted to said first shutter blades respectively at different positions to form a parallel link mechanism in cooperation with said first arm, and a third arm pivoted on said base plate and pivoted to said second shutter blades respectively at different positions to form a parallel link mechanism in cooperation with said first arm, said first arm being pivoted on said base plate by fitting a shaft standing on said base plate into a bearing sleeve carrying said first arm, and said second arm and third arm being pivoted on said base plate by fitting shafts provided in said base plate respectively into holes made in said second arm and third arm.

5. A focal plane shutter for cameras according to claim 4 wherein, said first shutter blades and second shutter blades are arranged in series.

* * * * *